United States Patent [19]

Watanabe

[11] 4,394,680
[45] Jul. 19, 1983

[54] COLOR TELEVISION SIGNAL PROCESSING APPARATUS

[75] Inventor: Toshiro Watanabe, Yokohama, Japan

[73] Assignee: Matsushita Electric Industrial Co., Ltd., Kadoma, Japan

[21] Appl. No.: 249,699

[22] Filed: Mar. 31, 1981

[30] Foreign Application Priority Data

Apr. 1, 1980 [JP] Japan .................................. 55-42991
Apr. 1, 1980 [JP] Japan .................................. 55-42992

[51] Int. Cl.³ ........................................... H04N 9/535
[52] U.S. Cl. ..................................................... 358/22
[58] Field of Search .................. 358/22, 19, 21 R, 183

[56] References Cited

U.S. PATENT DOCUMENTS 4,122,490 10/1978 Lish ....................................... 358/22

Primary Examiner—John C. Martin
Attorney, Agent, or Firm—Cushman, Darby & Cushman

[57] ABSTRACT

A novel color television signal processing apparatus which is capable of producing a keying signal (soft key signal) with gradation usable for such signal processing as detecting portions with a specified color in a first composite color television signal and inserting a second color television signal in the detected portions, and is capable of processing line (encoded) and soft chromakey operations by producing a soft chromakey signal from a composite color image signal made by, e.g. NTSC system, and further enables efficient image mixing operations by sampling color television signals or using stored data of three color signal components and obtaining a keying signal with high precision in digital signal processing.

25 Claims, 7 Drawing Figures

COLOR TELEVISION SIGNAL PROCESSING APPARATUS

BACKGROUND OF THE INVENTION

1. Field of the Invention

The present invention relates to a color television signal processing apparatus, more particularly to a chromakey apparatus used for insertion of a picture image into another picture image.

2. Prior Arts

Chromakey techniques have been developed and are currently employed, for example, for taking out desired regions with a specified color in a color television image and inserting another image therein. The conventional color image composition processing, i.e. chromakey techniques, employ a keying signal obtained mainly from a difference of hue component contained in a color television signal, among other two color signal components, a luminance and a saturation components. The chromakey techniques are grouped into hard chromakey and soft chromakey techniques depending on whether keying signal characteristics and operations of mixing circuits are a switching type or a linear type, respectively. The soft chromakey technique employs a keying signal (soft key signal) having gradation which linearly gates the mixing circuit in such a manner that the closer the color tones of regions on a color television screen to a base color for extraction are the more the extraction degrees increase. Although this soft chromakey technique can provide for an easier image dissolve than the hard chromakey technique, apparatus carrying out soft chromakey processing inevitably require three R, G, B signals, corresponding to three primary color signals, as their input image signals. This means that the signal input sources are limited to only color cameras. But, in general, color image signals are composite signals made by, e.g. NTSC system, and are transmitted through a single signal line. Therefore, soft chromakey processing using such composite color television signals requires use of R-G-B demodulators in the front stage of the conventional soft chromakey signal generators. A chromakey technique which carries out dissolve processing by use of composite color television signals without decomposition of three color component signals is designated as a line chromakey (encoded chromakey) technique. The line chromakey technique has an advantageous feature that the chromakey processing is possible, when necessary, even after picture recording by use of VTR tapes. Accordingly, the soft chromakey applicable for the line chromakey technique is demanded in various fields of television industry.

The descriptions so far made are of several chromakey processing techniques for the analog composite color television signals. Digital processing for the color television signals have been widely employed so that digital VTR apparatus will become into practical use in the quite near future. In view of these circumstances it is highly desirable to provide chromakey apparatuses which are capable of carrying out signal processing by use of encoded composite color television signals.

On the other hand, the conventional chromakey apparatuses have a number of shortcomings. Manipulation of the selection of the color for regions to be extracted, mainly the selection of the hue level by use of e.g. a hue dial, is very critical, and is liable to be affected frequently and in a complex manner by illumination conditions of a chromakey panel and by time-varying electrical characteristics of the color cameras per se. Also it takes a great deal of time for preparation prior to the acquisition of a desired color image on a monitor television for almost every instance of chromakey processing.

SUMMARY OF THE INVENTION

The present invention provides a novel color television signal processing apparatus which is capable of producing a keying signal (soft key signal) with gradation usable for such signal processing as detecting portions with a specified color in a first composite color television signal and inserting a second color television signal in the detected portions. The color television signal processing apparatus embodying the present invention can process line (encoded) and soft chromakey operations by producing a soft chromakey signal from a composite color image signal made by, e.g. an NTSC system. In addition, such an apparatus enables efficient image mixing operations by sampling color television signals and obtaining a keying signal with high precision in digital signal processing.

DESCRIPTION OF THE PREFERRED EMBODIMENT

A color television signal processing apparatus in accordance with the present invention comprises a first and a second register means for respectively dividing a first and a second color television signals into signals of picture element levels and for memorizing states of the picture element levels, or for storing level data of three color signal components, with a period of one n-th (n: integer) of one period of a color chrominance subcarrier signal, a calculation means for calculating correlationships, by use of the signals of the picture element levels, between three color signal components contained in the first and the second color television signals, and issuing a predetermined correlation signal, a generating means for taking out at least one signal component among a chroma difference component and a luminance difference component from the correlation signal, and generating a chromakey signal for controlling a signal level of the first color television signal, and a mixing means for mixing the level-controlled first color television signal with a third color television signal.

The operational principle of the chromakey apparatus embodying the present invention will be described in the following by referring to the accompanying drawings. Descriptions will be given in the following for a case where a composite color television signal is demodulated resulting in a luminance, a hue and a saturation component signals.

Figure 1:
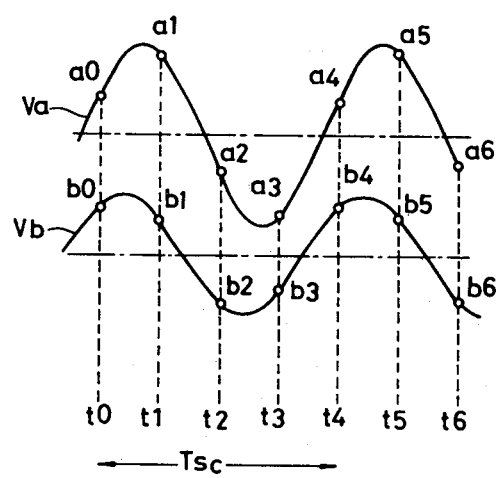
FIG. 1 is a chart showing enlarged signal wave forms of a pair of color television signals.

FIG. 1 is a view showing enlarged signal wave forms of a first and a second color television signals, Va and Vb having a same synchronizing relationship between them. Signal levels a0, a1, ..., a6, ... (or b0, b1, ..., b6, ... ) for the signal Va (or Vb) are picture element levels sampled by sampling pulses which divide a chrominance subcarrier period Tsc with e.g. four equal periods. When microscopically analyzed, the color television signals can be expressed as follows:

$$Va = Ya + Ca \cdot \sin(\theta a + \omega t) \ldots \quad (1), \text{ and}$$

$$Vb = Yb + Cb \cdot \sin(\theta B + \omega t) \ldots \quad (2),$$

where Ya and Yb are luminance components, Ca and Cb saturation components, and $\theta a$ and $\theta b$ hue angles, respectively.

From equations (1) and (2), it can be shown that the sampling signal levels a0, a1 and a2, and b0, b1 and b2 satisfy the following equations:

$$\left. \begin{array}{l} a0 = Ya + Ca \cdot \sin\theta a \\ a1 = Ya + Ca \cdot \cos\theta a \\ a2 = Ya - Ca \cdot \sin\theta a \end{array} \right\} \quad (3), \text{ and}$$

$$\left. \begin{array}{l} b0 = Yb + Cb \cdot \sin\theta b \\ b1 = Yb + Cb \cdot \cos\theta b \\ b2 = Yb - Cb \cdot \sin\theta b \end{array} \right\} \quad (4).$$

By solving the equations (3) and (4), three signal components Ya, Ca and $\theta a$ for the color television signal Va are obtained as follows:

$$\left. \begin{array}{l} Ya = (a0 + a2)/2, \\ Ca = \sqrt{[(a0 - a2)/2]^2 + [(2 \cdot a1 - a0 - a2)/2]^2} \text{, and} \\ \theta a = \sin^{-1}[(a0 - a2)/(2 \cdot Ca)] \end{array} \right\} \quad (5).$$

Similarly, other three signal components Yb, Cb and $\theta b$ for the color television signal Vb are obtained as follows:

$$\left. \begin{array}{l} Yb = (b0 + b2)/2, \\ Cb = \sqrt{[(b0 - b2)/2]^2 + [(2 \cdot b1 - b0 - b2)/2]^2} \text{, and} \\ \theta b = \sin^{-1}[(b0 - b2)/(2 \cdot Cb)] \end{array} \right\} \quad (6).$$

Correlationships between the two television signals Va and Vb are also obtainable for each signal component as follows:

A luminance difference $\Delta Y$ is given by the following equation:

$$\begin{aligned} \Delta Y &= Ya - Yb \\ &= (a0 - b0 + a2 - b2)/2. \end{aligned} \quad (7)$$

A saturation difference $\Delta C$ is given by the following equation:

$$\begin{aligned} \Delta C &= Ca - Cb \\ &= \sqrt{[(a0 - a2)/2]^2 + [(2 \cdot a1 - a0 - a2)/2]^2} \\ &\quad - \sqrt{[(b0 - b2)/2]^2 + [(2 \cdot b1 - b0 - b2)/2]^2} \; . \end{aligned} \quad (8)$$

A hue difference $\Delta\theta$ is given by the following equation:

$$\begin{aligned} \Delta\theta &= \theta a - \theta b \\ &= \sin^{-1}[(a0 - a2)/(2 \cdot Ca)] \\ &\quad - \sin^{-1}[(b0 - b2)/(2 \cdot Cb)]. \end{aligned} \quad (9)$$

These difference values are normalized with respect to the color television signal Va and used for a correlation function $\phi$ for those two television signals Va and Vb:

$$\phi = (1 - \Delta Y/Ya) \cdot (1 - \Delta C/Ca) \cdot (1 - \Delta\theta/2\pi) \ldots \quad (10).$$

It is possible to carry out signal processing corresponding to the conventional chromakey techniques, when one of the signal levels among the two television signals are controlled by use of a correlation function $\phi\theta (0 \leq \phi\theta \leq 1)$ given by a relationship of $$\phi\theta = (1 - \Delta\theta/2\pi) \ldots \quad (11).$$

In this case only the hue signal difference component $\Delta\theta$ among the three color components is taken out, i.e. only the hue difference among the three color signal components is taken into consideration between the two color television signals Va and Vb. But it is practically impossible to obtain the hue difference $\Delta\theta$ necessary for the correlation function $\phi\theta$ given by the eq. (11), since it is quite difficult in the analog processing techniques employed in the conventional chromakey operations to calculate the equations (5), (6) and (9) for the purpose of obtaining the hue difference $\Delta\theta$. This is because a keying signal is obtained not from the hue difference only, in the strict sense of the term. In other words, this is because the keying signal level is variable under the influence of the other signal components such as the saturation component.

In the chromakey signal processing for carrying out mainly image insertion, the visual image correlation between two images plays eventually an important role. In this respect it is not appropriate to separate three color signal components as in eq. (11). Therefore, it is practically preferably to employ a more realistic correlation function $\phi K$, for example, expressed in the following eq. (12), in the case where two images have closely correlated color regions, and/or three color signal components (luminance, saturation and hue) have to be fully taken into consideration:

$$\phi K = (1 - K1 \cdot \Delta Y/Ya) + (1 - K2 \cdot \Delta C/Ca) + (1 - K3 \cdot \Delta\theta/2\pi) \ldots \quad (12),$$

where K1, K2 and K3 are weighting coefficients respectively corresponding to three color signal components.

It is naturally also possible to employ other correlation functions instead of the one in eq. (12), for example, non-addition functions similar to the addition function in eq. (12), which make only the maximum or minimum value valid among the three terms.

The chromakey apparatus embodying the present invention employs a correlation signal $\phi K$ expressed by eq. (12) as a keying signal, by which keying signal the signal level of one of the color television signals is controlled responding to the magnitude of the correlationship between the two color television signals Va and Vb. Thus, the chromakey apparatus disclosed in the instant application has a distinctive feature in the versatility of, its chromakey applications.

For example, it is possible to carry out signal processing similar to the conventional chromakey processing, by using one of the two color television signals Va and Vb as a reference color signal for the image insertion, and by making the weighting coefficients K2 and K3 for the chromaticity difference larger than the rest; and further it is also possible to expand the processing thereof to the luminance key processing (in which the luminance difference is a main factor among others) by selecting the weighting coefficients in such a manner that K1 is larger than the others.

Accordingly, it is to be noted that it is possible to obtain desired color detection characteristics by calculation of several picture element levels, using a novel keying signal generator provided in the chromakey apparatus embodying the present invention.

In the actual signal processing carried out by the soft chromakey apparatus embodying the present invention, a keying signal is obtained by calculations in real time processing, using the signals of the picture element levels a0, a1 and a2, and b0, b1 and b2. The keying signal calculation is made, as described above, by use of equations (5) to (9) and (12). The calculated keying signal is used to determine the keying signal level at $t=t1$ (in FIG. 1).

A correlation operator circuit provided in the soft chromakey apparatus embodying the present invention can proceed such a calculation successively either by shifting the sampling points in a time sequential manner, or by receiving picture element signal levels for the processing in a time sequential manner.

A digital-coded (e.g. PCM) color television signal is suitable for the signal level calculations described above. Such real time processing is possible to be easily carried out by employing high speed multiplier and adder circuits, and if necessary ROM (read only memory) devices with various tabular function data memorized therein for complicated calculations.

Figure 2:
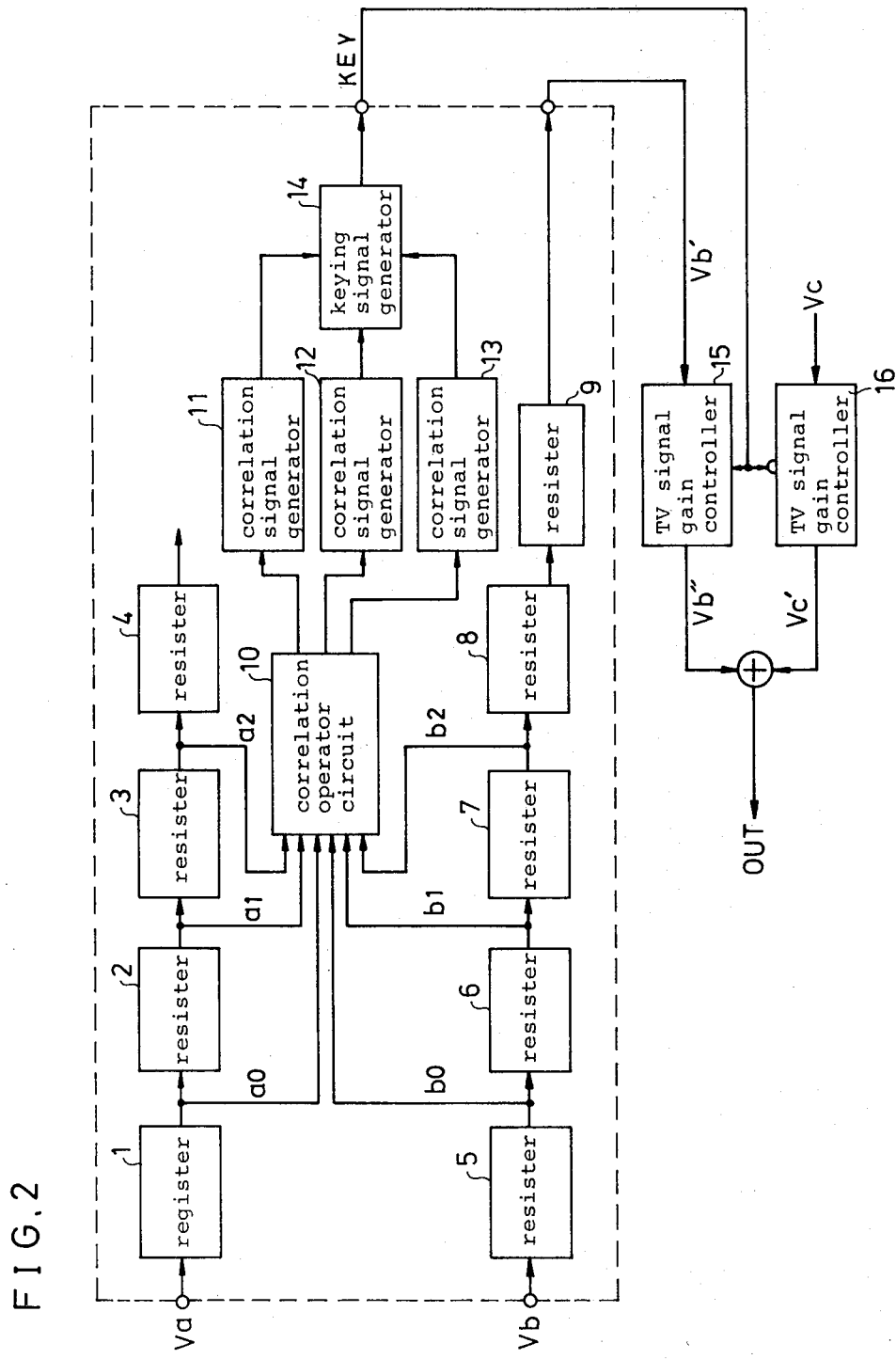
FIG. 2 is a block diagram of a color television signal processing apparatus embodying the present invention.

FIG. 2 is a block diagram of a color television signal processing apparatus embodying the present invention. The circuit portion enclosed by the dotted line corresponds to a keying signal generator circuit disclosed in the instant application. A digital color television signal Va is sampled, and its levels are encoded into 8-bit data by use of a sampling clock pulse signal with an oscillation frequency four times as high as that of a chrominance subcarrier (fsc). Registers 1 to 4 respectively process one word level information (8-bit input data). They form a shift register and are driven by another clock pulse signal with the same frequency as that of the sampling clock pulse signal.

Signals a0, a1 and a2 corresponding to picture element level data temporarily stored in the registers, are issued from their output terminals. Similar to the case of the color television signal Va, registers 5 to 7 are provided to form another shift register, and output signals b0, b1 and b2 are issued from their output terminals, for another color television signal Vb.

A correlation operator circuit 10 is constituted by pipe-line-connected high speed adder devices and ROM devices with various tabular function data memorized therein, and serves to derive such values as $\Delta Y$, $Ya$, $\Delta C$, $Ca$ and $\Delta\theta$ by use of the picture element level signals a0, a1 and a2, and b0, b1 and b2, in accordance with equations (5) to (9). Such ROM devices serve to carry out complicated functional calculations such as $\sqrt{X^2+Y^2}$ and $\sin^{-1}\theta$, which calculations take much time when carried out by simple adder and multiplier devices.

The correlation operator circuit 10 comprises a pair of subtraction circuits and an adder circuit, which circuits serve to calculate the luminance difference $\Delta Y$ given by eq. (7), and further two pairs of subtraction circuits, square calculation circuit (consisting of ROM devices with tabular function data memorized therein), a pair of adder circuits and a pair of square root calculation circuits (consisting of ROM devices with tabular function data memorized therein), which circuits serve to calculate the saturation data Ca given by eq. (5) and Cb given by eq. (6). The correlation operator circuit 10 further comprises calculation circuits which serve to calculate the hue difference $\Delta\theta$ given by eq. (9).

Correlation signal generators 11 to 13 respectively compose correlation signal components for three color signal components $(1-K1\cdot\Delta Y/Ya)$, $(1-K2\cdot\Delta C/Ca)$ and $(1-K3\cdot\Delta\theta/2\pi)$, after multiplying the output signal components $\Delta Y/Ya$, $\Delta C/Ca$ and $\Delta\theta 2\pi$ by suitable weighting coefficients K1, K2 and K3. A keying signal generator 14 is a matrix circuit comprising an adder circuit, and generates a keying signal "KEY" corresponding to the correlation function $\phi K$ of eq. (12) after adding three correlation signal components issued from the correlation signal generators 11 to 13. It is practical that the correlation function $\phi K$ given by eq. (12) is used only when two image signals to be processed are largely correlated with each other. On the contrary, when the two image signals are not largely correlated with each other, it is possible to employ other simplified correlation functions.

In addition, it is also possible to process further the resultant signal calculated by eq. (12) by suitably amplifying some portions of the calculation result, by use of a keying signal processing circuit provided in the keying signal generator 14. This signal processing can be made by the keying signal processing circuit which comprises a linear to non-linear conversion ROM devices with tabular function data memorized therein, a simple limiter circuit, or a hysteresis circuit.

Registers 8 and 9 comprise a plurality of registers and are used to compensate a time lag accompanied with the keying signal "KEY", which is obtained from the signals processed through the circuits 10 to 14 comprising a number of registers connected in a pipe-line form. A digital color television signal Vb' synchronized with the keying signal "KEY" is issued from the register 9, i.e. from an output terminal of the keying signal generator circuit embodying the present invention and enclosed by the dotted line in FIG. 2.

A gain controller 15 is a digital color television signal level controlling circuit comprising a high speed multiplier circuit device. The gain controller 15 issues a level-controlled color television signal Vb" by carrying out multiplication of the color television signal Vb' by the keying signal "KEY". This means that the color television signal Vb is level-controlled responding to a correlationship degree thereof with the other color television signal Va.

An application of the chromakey technique, where the color television signal processing is made by the claimed keying signal generator circuit, taking into account of mainly the correlationship of a chromaticity difference, particularly a hue difference will hereinafter be described. We assume here that the color television signal Va is a color signal corresponding to a color which is in the color television signal Vb and is required to be extracted therefrom. In such a case, the color television signal Va may be a television signal produced by a back color image, or, alternatively, the color television signal Va can be obtained in such a manner that a desired color signal level is suitably memorized in the registers 1 to 4 and that an output signal of the register 4 is fed back to the input side of the register 1 with a feedback cycle synchronized with a timing cycle of the sampling clock. Then, a correlationship between the specified color signal and the color television signal Vb is calculated, and a keying signal is generated by setting the weighting coefficients for the chromaticity difference larger than that for the other difference. The color television signal Vb is level-controlled responding to the keying signal levels so that signal portions in the color television signal Vb with the specified color are damped. A third color television signal Vc is similarly, but with a polarity opposite color television signal Vb, level-controlled by a gain controller 16 (similar to the gain controller 15) by use of the same keying signal. By mixing the level-controlled color television signal Vb" with the level-controlled color television signal Vc', we obtain a new dissolved color television signal, i.e. a new color image with another color image partly inserted therein.

The so far described digital type chromakey technique enables correct calculations of various complicated algorithm, which calculations cannot normally be carried out by use of analog signals. The chromakey technique disclosed in the instant application has a distinctive feature that the color detection can be advanced precisely in desired manners, and permits chromakey processing by using a middle color as a color detection basis.

It has been so far assumed that the luminance components Ya and Yb are constant values in deriving the correlation function given by eq. (12). But, in fact they have high frequency characteristics. In this respect it is more practical and preferable to decompose the color television signal by use of, e.g. a digital comb filter and to carry out the correlation calculations by use of the decomposed chroma components. On the other hand, in the descriptions so far made, three color signal components are sampled at different three points for a picture element in a horizontal scanning direction. But, it is naturally possible to sample picture elements in both horizontal and vertical scanning directions and to process the sampled signal levels by use of appropriate correlation functions.

The color television signal processing apparatus embodying the present invention comprises a generating means for generating a chromakey signal which is used for controlling the signal level of one or both of two input color television signals. Thus, the claimed apparatus is applicable for various television industry fields where composite color television signals are digital-processed. It is not restricted to instances where the level-controlled color television signal is similar to the other composite color television signal in signal characteristics. In other words, for example, it is possible to control the level of a color television signal by use of a television signal with, e.g. only a chromaticity component in the other composite color television signal. This means that it is also possible to carry out color conversion processing where an image containing some portions with a specified color in an input image signal are converted into another image containing the portions with another desired color.

Figure 3:
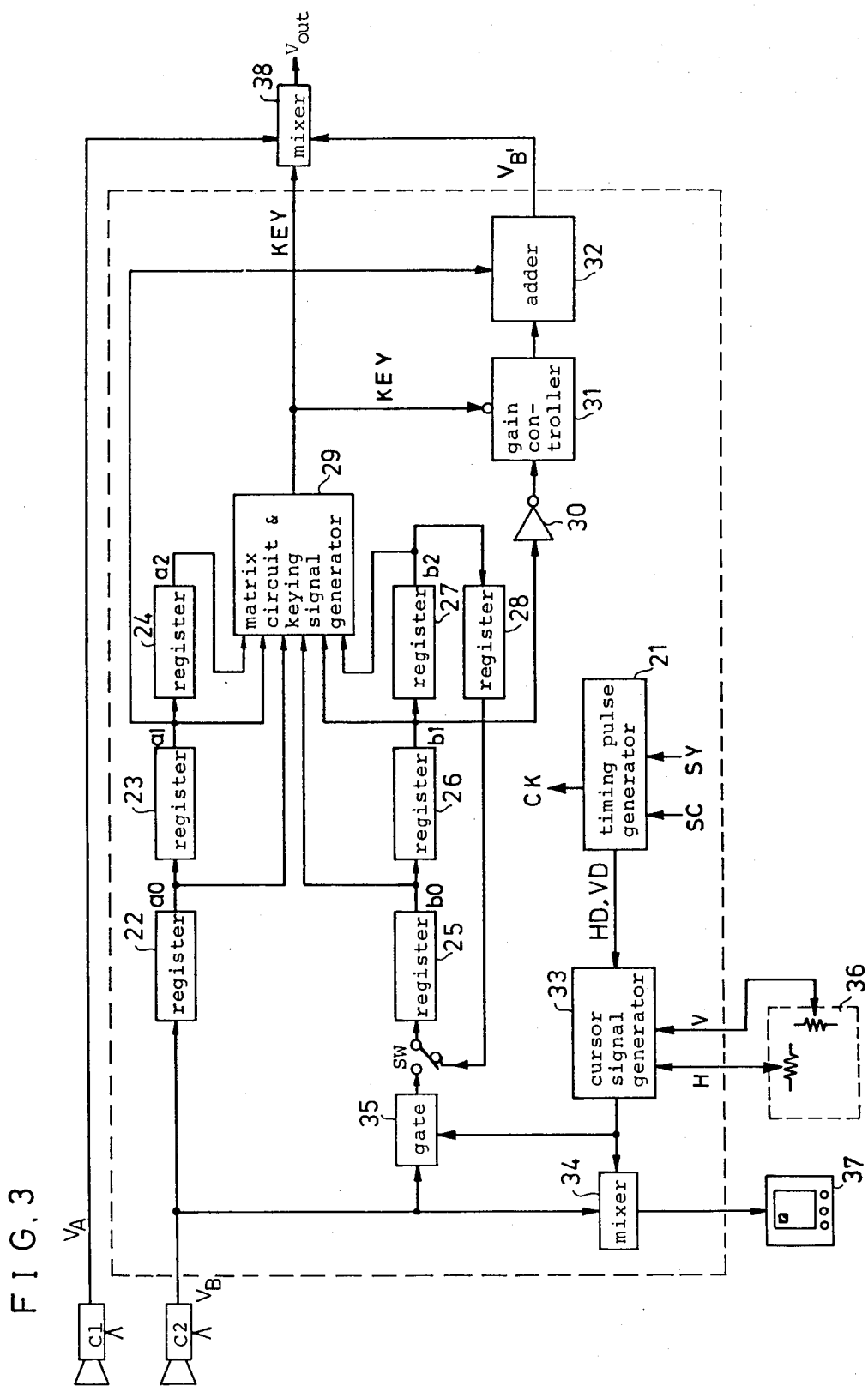
FIG. 3 is a block diagram of another color television signal processing apparatus embodying the present invention.

FIG. 3 is a block diagram of another color television signal processing apparatus embodying the present invention. The circuit portion enclosed by the dotted line corresponds to a color television signal processing apparatus of a second embodiment disclosed in the instant application. The apparatus of FIG. 3 is suitable for the color conversion processing described above. FIG. 4(a) to FIG. 4(d) are schematic views illustrating an image conversion situation on a monitor television panel obtainable by the color television signal processing apparatus in accordance with the second embodiment of the present invention.

Figure 4A:
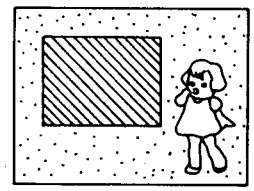
FIG. 4(a) to FIG. 4(d) are schematic views illustrating images on a monitor television obtainable by the processing apparatus embodying the present invention.
Figure 4B:
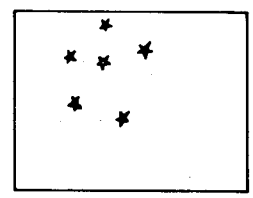
Figure 4C:
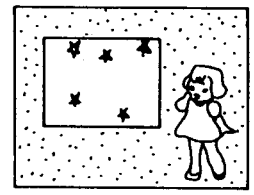
Figure 4D:
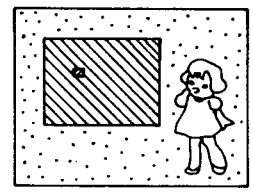

The signal processing apparatus of FIG. 3 comprises a cursor signal generator 33 which provides cursor indication on a monitor television. FIG. 4(a) shows a color image by a color television signal VB issued from a television camera C2 for taking a camera object. FIG. 4(b) shows another color image by another color television signal VA issued from another television camera C1 for taking a background image object. FIG. 4(c) shows a dissolved image on the monitor television panel, obtained from the two color television signals VA and VB. The composite image in FIG. 4(c) is produced in such a manner that the background image is partly inserted in some regions with a specified color on the color image shown in FIG. 4(a). FIG. 4(d) shows still another color image similar to that of FIG. 4(a), but with cursor position indication at a place with a color to be extracted.

The color television signal processing apparatus of FIG. 3 comprises a novel color detection and processing circuit for generating a chromakey signal, like the chromakey signal generating apparatus in accordance with the first embodiment of the present invention, and further a cursor signal generating means used for designation of the regions with a color to be extracted from a color image on a monitor television panel.

Circuit constitution of the color television signal processing apparatus shown in FIG. 3 will be described in the following. A timing pulse generator 21 generates a clock pulse CK and other timing pulses such as a horizontal synchronizing signal HD and a vertical synchronizing signal VD, by use of a synchronizing signal SY and a chrominance subcarrier signal SC as a time base. The clock pulse CK may be so produced that a frequency thereof is four times as high as that of the chrominance subcarrier signal SY. Registers 22 to 24 encodes a PCM color television signal into 8-bit data and stores the encoded signal data therein. The registers 22 to 24 form a shift register driven by the clock pulse CK with the sampling frequency. Registers 25 to 27 similarly forms another shift register for another color television signal. A keying signal generator 29 includes a matrix circuit for mixing signals of picture element levels a0, a1 and a2, and b0, b1 and b2 issued from the registers 22, 23 and 24, and 25, 26 and 27, respectively. The keying signal generator 29 generates a keying signal "KEY" in a similar manner to the case of the first embodiment. That is, the generator 29 corresponds to the correlation operator circuit 10 and the generators 11, 12, 13 and 14 in FIG. 2. When a change-over switch SW is set to a connection state as shown in FIG. 3, the keying signal is produced by correlation calculations by use of image signal data temporarily stored in the registers 22 to 24, and another group of image signal data circulated through the registers 25 to 28. In this switching setting, the color signal corresponding to a color to be extracted is produced by circulating level data of the picture element signal which data are selected during one period of the signal for one selected color.

Operations of extraction-color designation circuit will be described below. The cursor signal generator 33 is operated by the clock pulse CK and other timing pulses such as the horizontal and vertical synchronizing signals issued from the timing pulse generator 21, and generates a cursor signal responding to signals H and V for a cursor position setting value adjustable by a Joy Stick circuit 36. A mixer 34 mixes the color television signal Vb from the television camera C2 for the image object with the cursor signal, and generates a mixed output signal for producing the object image containing cursor position indication on a monitor color television 37. The cursor signal is also used to control a gate 35 so that the color television signal Vb appears at an output terminal of the gate 35, only when the cursor signal is issued from the cursor signal generator 33, i.e. only when the cursor indication is made on the monitor television. A reference color signal for color regions to be extracted is processed, and its level data are stored in the registers 25 to 28, when the cursor position is moved by use of the joy stick operation to a place in the color regions on the monitor to be extracted, and when the switch SW is changed over to the side of the output terminal of the gate 35.

An inverter 30 inverts only chroma component data of the reference color signal stored in the registers 25 to 26 (or 28). A gain controller 31 controls a level of a signal issued from the inverter 30, in a manner that the signal level is damped responding to the signal level of the keying signal "KEY". An adder 32 adds the level-controlled signal, which is a chromakey signal corresponding to a complementary color for the reference color television signal VB.

The circuits 30 to 32 form key color suppressing circuits which suppress unnatural colors observed like flares at boundary regions between two combined images. The key color suppressing circuits per se and their operations are prior art in the application fields of conventional soft chromakey apparatuses where signal processing is carried out for analog signals. These key color suppressing circuits are especially useful, when the soft chromakey processing utilizes a keying signal with gradation for the purpose of obtaining more natural chromakey combined images.

A color television signal VB' from the adder 32 is then mixed by a mixer 38 with the color television signal Va from the television camera C1 for the picture object and the keying signal "KEY", thereby obtaining a chromakey combined television signal Vout therefrom.

In most cases, the chromakey processing is made for one color in the color image to be extracted. Accordingly, it is not always necessary to continuously sample three color components by driving the shift register consisting of the registers 25 to 28. In such cases, it is possible to use signal data stored in advance in the registers 25 to 28. Therefore, it is possible to simplify one input system of the keying signal generator 29 provided with the matrix circuit. This may serve to shorten the real time calculation time carried out in the keying signal generator 29.

In addition, it is possible to insert or extract many image regions with different colors by further modifying the disclosed sampling method for the reference colors to be extracted. And instead of the cursor indication method in selecting the image regions to be extracted, it is naturally possible to employ othe methods. For example, it is also practical to employ a light pen frequently used in the graphic display fields, in selecting the desired image regions for the chromakey processing.

The chromakey processing techniques by use of the color television signal processing apparatus of the present invention, have been so far described for the polar coordinates system of color phase relationships between two points on color vector diagrams, i.e. by using a hue and a luminance components. However, it is possible to employ other coordinates system such as a Cartesian coordinates system for the I- and Q-axes. In particular, when the sampling frequency is set to be $4 \cdot f_{sc}$ as described above, it is possible to employ a demodulation circuit in the chromakey apparatus for separation of the luminance Y, I and Q components, by setting four sampling points on the $\pm$I-axis and $\pm$Q-axis. This sampling method is advantageous in that the demodulation circuit can easily separate the luminance Y, I and Q components. Apart from the conventional chromakey technique of using mainly a hue component difference, it is also practical to employ chromaticity correlation functions which give a distance value between two points on the color vector diagram or a corresponding approximate value, from the I and Q component differences between two color television signals by also taking into account of a bandwidth ratio between I-axis and Q-axis components. Roughly speaking, such correlation functions can be determined in a manner similar to the case of using the three color components, a luminance, a saturation and a hue components described bove, by making the luminance, I and Q components correspond to the luminance, saturation and hue components.

In conclusion, the present invention provides a novel color television signal processing apparatus which is capable of producing a keying signal (soft key signal) with gradation usable for such signal processing as detecting portions with a specified color in a first composite color television signal and inserting a second color television signal in the detected portions. The color television signal processing apparatus embodying the present invention can process line (encoded) and soft chromakey operations by producing a soft chromakey signal from a composite color image signal made by, e.g. NTSC system. In addition, such an apparatus enables efficient image mixing operations by sampling color television signals and obtaining a keying signal with high precision in digital signal processing.

What is claimed is:

1. A color television signal processing apparatus comprising:
    a first and a second register means for selectively dividing a first and a second color television signals into sample signals indicative of picture element levels during periods of one n-th (n: integer) of one period of a color chrominance subcarrier signal and temporarily storing indicia of said sample signals for a predetermined number of sequential periods,
    a calculation means for calculating correlationships, by use of said sample signals indicative of said picture element levels, between at least one color signal component contained in said first and said second color television signals, and for issuing a predetermined correlation signal,
    a generating means for taking out at least one signal component among a chroma difference component and a luminance difference component from said correlation signal, and for generating a chromakey signal for controlling a signal level of said first color television signal, and a mixing means for mixing the level-controlled first color television signal with a third color television signal.

2. A color television signal processing apparatus in accordance with claim 1 further comprising a control means for issuing a designation signal corresponding to a selected position on a monitor television, wherein said second color television signal corresponds to a specified color signal for a color of said selected position and in said first color television signal.

3. A color television signal processing apparatus in accordance with claim 1 or 2,
wherein said calculation means is for calculating a difference correlationship between two pairs of color signal components contained in said first and said second color television signals, and
said predetermined correlation signal has a signal level responding to a degree of the difference correlationship between said first and said second color television signals.

4. A color television signal processing apparatus in accordance with claim 1 or 2, wherein said third color television signal is said first color television signal.

5. A color television signal processing apparatus in accordance with claim 1 or 2, wherein said third color television signal is said second color television signal.

6. A color television signal processing apparatus in accordance with claim 1 or 2, wherein said second color television signal is a monochromatic color signal contained in said first color television signal.

7. A color television signal processing apparatus in accordance with claim 1 or 2, wherein
said calculation means is for calculating a difference correlationship between three pairs of color signal components, among a first pair of luminance components, a second pair of both I- and Q-axes components, and a third pair of both luminance, I-axis and Q-axis components,
said predetermined correlation signal has a signal level responding to a degree of the difference correlationship between said first and said second color television signals.

8. A color television signal processing apparatus in accordance with claim 1 or 2, wherein
said calculation means is for calculating a difference correlationship between three pairs of color signal components, a luminance, a saturation and a hue components, contained in said first and said second color television signals,
said difference correlationship being given by a correlation function $\phi K$;

$$\phi K = (1 - K1 \cdot \Delta Y/Ya) + (1 - K2 \cdot \Delta C/Ca) + (1 - K3 \cdot \Delta\theta/2\pi),$$

where Ya and Ca are a luminance component and a saturation components contained in said first color television signal, $\Delta Y$, $\Delta C$ and $\Delta\theta$ are a luminance difference, a saturation difference and a hue difference between said three pairs of color signal components, and K1, K2 and K3 are weighting coefficients, and said predetermined correlation signal has a signal level responding to a degree of the difference correlationship given by said correlation function $\phi K$.

9. A color television signal processing apparatus in accordance with claim 2, further comprising another mixing means for mixing said first color television signal with said designation signal issued from said control means.

10. The apparatus of claim 3 wherein said color signal components comprise at least one of the luminance, saturation and hue angle components of first and second color television signals.

11. The apparatus of claim 1 wherein said second color television signal is derived from said first color television signal.

12. A color television signal processing apparatus comprising:
a first and a second register means, including a pair of shift registers, for selectively sampling picture element levels of a first and a second color television signals at a period of one n-th (n: integer) of one period of a color chrominance subcarrier signal, and temporarily storing a predetermined number of successive picture element level samples,
a switching means for selecting two chromakey operations between a first circuit operation wherein stored states of said picture element levels are refreshed with a predetermined shifting cycle and a second circuit operation wherein predetermined states of picture element levels for a color television image are circulated through one of said one pair of the shift registers with another predetermined shifting cycle,
a calculation means for calculating correlationships, by use of signal indicative of said picture element level samples, between at least one color signal component contained in said first and second color television signals, and for issuing a predetermined correlation signal,
a generating means for taking out at least one signal component among a chroma difference component and a luminance difference component from said correlation signal, and for generating a chromakey signal for controlling a signal level of said first color television signal, and
a mixing means for mixing the level-controlled first color television signal with a third color television signal.

13. A color television signal processing apparatus in accordance with claim 10 further comprising a control means for issuing a designation signal corresponding to a selected position on a monitor television, wherein said second color television signal corresponds to a specified color signal for a color of said selected position and in said first color television signal.

14. A color television signal processing apparatus in accordance with claim 12 or 13,
wherein said calculation means is for calculating a difference correlationship between two pairs of color signal components contained in said first and said second color television signals, and
said predetermined correlation signal has a signal level responding to a degree of the difference correlationship between said first and said second color television signals.

15. A color television signal processing apparatus in accordance with claim 12 or 13, wherein said third color television signal is said first color television signal.

16. A color television signal processing apparatus in accordance with claim 12 or 13, wherein said third color television signal is said second color television signal.

17. A color television signal processing apparatus in accordance with claim 12 or 13, wherein said second color television signal is a monochromatic color signal contained in said first color television signal.

18. A color television signal processing apparatus in accordance with claim 12 or 13, wherein
said calculation means is for calculating a difference correlationship between three pairs of color signal components, among a first pair of luminance components, a second pair of both I- and Q-axes components, and a third pair of both luminance, I-axis and Q-axis components,
said predetermined correlation signal has a signal level responding to a degree of the difference correlationship between said first and said second color television signals.

19. A color television signal processing apparatus in accordance with claim 12 or 13, wherein
said calculation means is for calculating a difference correlationship between three pairs of color signal components, a luminance, a saturation and a hue components, contained in said first and said second color television signals,
said difference correlationship being given by a correlation function $\phi K$;

$$\phi K = (1 - K1 \cdot \Delta Y/Ya) + (1 - K2 \cdot \Delta C/Ca) + (1 - K3 \cdot \Delta\theta/2\pi),$$

where Ya and Ca are a luminance component and a saturation components contained in said first color television signal, $\Delta Y$, $\Delta C$ and $\Delta\theta$ are a luminance difference, a saturation difference and a hue difference between said three pairs of color signal components, and K1, K2 and K3 are weighting coefficients, and
said predetermined correlation signal has a signal level responding to a degree of the difference correlationship given by said correlation function $\phi K$.

20. A color television signal processing apparatus in accordance with claim 13, further comprising another mixing means for mixing said first color television signal with said designation signal issued from said control means.

21. The apparatus of claim 14 wherein said color signal components comprise at least one of the luminance, saturation, and hue angle components of said first and second color television signals.

22. A color television signal processing apparatus responsive to first; and second color television signals, said color television signals having associated therewith a color chrominance subcarrier signal, said apparatus comprising:
first register means, responsive to said first color television signal, for generating respective picture element signals indicative of said first color television signal, for generating respective picture element signals indicative of samples of said first color television signal in successive sequential time periods, said time periods being a predetermined fraction of one period of said color chrominance subcarrier signal;
second register means, responsive to said second color television signal, for generating respective picture element signals indicative of samples of said second color television signal during said successive sequential time periods,
calculation means, responsive to said first and second register means picture element signals, for generating a correlation signal indicative of a predetermined correlation function between said first register means picture element signals and said second register means picture element signals;
generation means, responsive to said correlation signal, for generating a level-controlled signal indicative of said first color television signal having a signal level controlled in accordance with at least one predetermined component of said correlation signal; and
mixer means for mixing said level-controlled signal with a third television signal.

23. The apparatus of claim 22 wherein said second shift register means comprises means for recirculating a predetermined number of said samples.

24. The apparatus of claim 22 wherein said predetermined correlation function comprises a difference correlation function ($\int k$) between at least one of the luminance components, saturation components and hue components of a predetermined number of samples said first and second color television signals.

25. The apparatus of claim 24 wherein said difference correlation function:

$$\int k = (1 - k1 \cdot \Delta Y/Ya) + (1 - ka \cdot \Delta C/Ca) + (1 - k3 \cdot \Delta\theta/2\pi)$$

where Ya and Ca are luminance and saturation components of said first color television signal, Ya, Ca and $\theta$ are the luminance difference, saturation difference and hue difference of said first and second color television signals and k1, k2 and k3 are weighting coefficients.

* * * * *